(12) United States Patent
Simoni (10) Patent No.: US 10,204,033 B2
(45) Date of Patent: Feb. 12, 2019

(54) METHOD AND SYSTEM FOR SEMANTIC TEST SUITE REDUCTION

(71) Applicant: Wipro Limited, Bangalore (IN)

(72) Inventor: Diglio Antonio Simoni, Raleigh, NC (US)

(73) Assignee: Wipro Limited, Bangalore (IN)

( * ) Notice: Subject to any disclaimer, the term of this patent is extended or adjusted under 35 U.S.C. 154(b) by 70 days.

(21) Appl. No.: 15/456,499

(22) Filed: Mar. 11, 2017

(65) Prior Publication Data
US 2018/0260309 A1 Sep. 13, 2018

(51) Int. Cl.
*G06F 9/44* (2018.01)
*G06F 11/36* (2006.01)

(52) U.S. Cl.
CPC ...... *G06F 11/3684* (2013.01); *G06F 11/3608* (2013.01); *G06F 11/3676* (2013.01)

(58) Field of Classification Search
CPC .......................................... G06F 8/34
See application file for complete search history.

(56) References Cited

U.S. PATENT DOCUMENTS

| 5,542,043 A * | 7/1996 | Cohen ................ G06F 11/3684 702/108 |
| 7,581,212 B2 | 8/2009 | West et al. |
| 8,239,826 B2 | 8/2012 | Elenburg et al. |
| 8,347,147 B2 | 1/2013 | Adiyapatham et al. |
| 2004/0107415 A1 * | 6/2004 | Melamed ............ G06F 11/3684 717/124 |
| 2005/0160322 A1 * | 7/2005 | West ................... G06F 11/3684 714/38.1 |
| 2011/0271255 A1 * | 11/2011 | Lau ...................... G06F 11/3668 717/124 |
| 2013/0268916 A1 * | 10/2013 | Misra ...................... G06F 8/74 717/123 |

* cited by examiner

*Primary Examiner* — Hang Pan
(74) *Attorney, Agent, or Firm* — LeClairRyan PLLC (57) ABSTRACT

Methods, non-transitory computer readable media, test management computing devices that obtain test scripts associated with a test suite for testing an application for the test scripts. A vector model is generated based on a semantic vectorization of the obtained test scripts. A cluster optimization is implemented on the vector model to identify a plurality of maximally separate and compact clusters. A subset of the test scripts that are candidates for facilitating reduction of the test suite is determined, based on the identified clusters, and an indication of each test script of the subset of the test scripts is output. With this technology, a semantic analysis of test scripts of a test suite is implemented to reduce the size of the test suite while advantageously maintaining the coverage with respect to an associated enterprise application as well as ensuring a low level of redundancy present in the test suite.

15 Claims, 5 Drawing Sheets

METHOD AND SYSTEM FOR SEMANTIC TEST SUITE REDUCTION

FIELD

This technology generally relates to methods and devices for testing enterprise applications and, more particularly, to optimizing test suites used to test enterprise applications.

BACKGROUND

Using large and often geographically distributed software development and testing teams, many enterprises deploy and maintain complex software systems over long periods of time. Prior to deployment, and during such maintenance, software testing teams utilize inventories or corpora of test scripts (referred to herein as a "test suites") to test functionality and other aspects of enterprise applications. With the growth in size and complexity of enterprise applications, testing of such applications has increasingly become inefficient and ineffective using available methods for maintaining test suites.

As enterprises mature, the test suites associated with their enterprise applications tend to become very large and are often poorly managed and utilized. Accordingly, testing teams often unknowingly test features multiple times within and across enterprise applications that use the same functionality, which is a poor use of resources. Many test suites include redundant test scripts inserted by individual testers that either did not attempt, or were unable, to conclusively determine whether a test script of the same functionality already existed in the test suite.

Additionally, enterprises often lack a holistic view of common test patterns within and across applications, there is often little homogeneity in the language that describes the purpose of, or the steps to be taken in, each test script of a test suite, and enterprises often lack an understanding of an entire test suite, which is required to avoid duplication of testing functionality. Accordingly, resources are unnecessarily expended while testing the same functionality of enterprise applications multiple times, often to the detriment of testing critical aspects of such applications and resulting in lower quality software.

SUMMARY

A method for semantic test suite reduction includes obtaining, by a test management computing device, one or more of a plurality of test scripts associated with a test suite for testing an application for the test scripts. A vector model is generated, by the test management computing device, based on a semantic vectorization of the obtained test scripts. A cluster optimization is implemented, by the test management computing device, on the vector model to identify a plurality of maximally separate and compact clusters. A subset of the test scripts that are candidates for facilitating reduction of the test suite is determined, by the test management computing device and based on the identified clusters, and an indication of each test script of the subset of the test scripts is then output by the test management computing device.

A test management computing device, comprising memory comprising programmed instructions stored thereon and one or more processors configured to execute the stored programmed instructions to obtain one or more of a plurality of test scripts associated with a test suite for testing an application for the test scripts. A vector model is generated based on a semantic vectorization of the obtained test scripts. A cluster optimization is implemented on the vector model to identify a plurality of maximally separate and compact clusters. A subset of the test scripts that are candidates for facilitating reduction of the test suite is determined, based on the identified clusters, and an indication of each test script of the subset of the test scripts is then output.

A non-transitory computer readable medium having stored thereon instructions for semantic test suite reduction comprising executable code which when executed by one or more processors, causes the one or more processors to obtain one or more of a plurality of test scripts associated with a test suite for testing an application for the test scripts. A vector model is generated based on a semantic vectorization of the obtained test scripts. A cluster optimization is implemented on the vector model to identify a plurality of maximally separate and compact clusters. A subset of the test scripts that are candidates for facilitating reduction of the test suite is determined, based on the identified clusters, and an indication of each test script of the subset of the test scripts is then output.

These methods, non-transitory computer readable media, and test management computing devices of this technology provide several advantages including reducing the number of test scripts in a test suite to facilitate more efficient and effective testing of enterprise applications. With this technology, a semantic analysis is implemented with respect to test scripts of a test suite to effectively identify a subset of test scripts that are candidates for removal from the test suite based on redundancy. Accordingly, this technology advantageously optimizes test suites by reducing the number of test scripts while maintaining code coverage.

DETAILED DESCRIPTION

Figure 1:
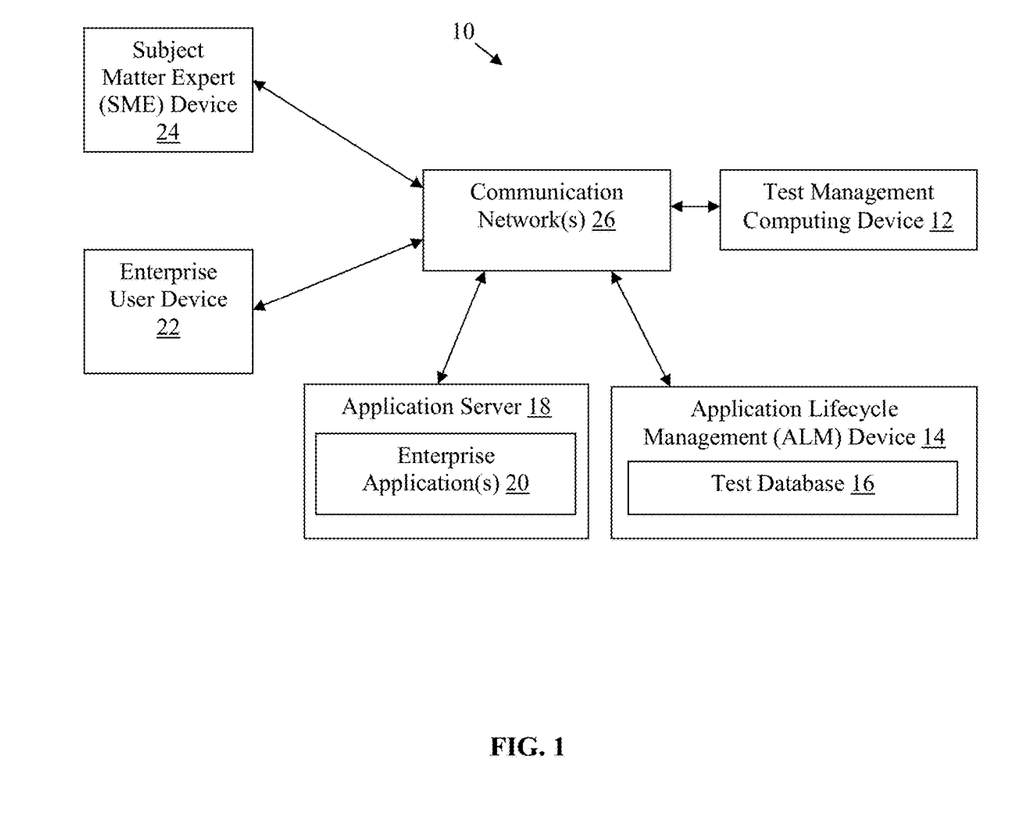
FIG. 1 is a block diagram of a network environment with an exemplary test management computing device.

Referring to FIG. 1, an exemplary network environment 10 with an exemplary test management computing device 12 is illustrated. The test management computing device 12 in this example is coupled to an application lifecycle management (ALM) device 14 with a test database 16, an application server 18 hosting enterprise application(s) 20, an enterprise user device 22, and a subject matter expert (SME) device 24 via communication network(s) 26, although the test management computing device 12, ALM device 14, application server 18, enterprise user device 22, and/or SME device 24, may be coupled together via other topologies. Additionally, the network environment 10 may include other network devices such as routers or switches, for example, which are well known in the art and thus will not be described herein. This technology provides several advantages including methods, non-transitory computer readable media, and test management computing devices that optimize test suites for testing enterprise applications, resulting in more efficient and effective testing and improved application quality.

Figure 2:
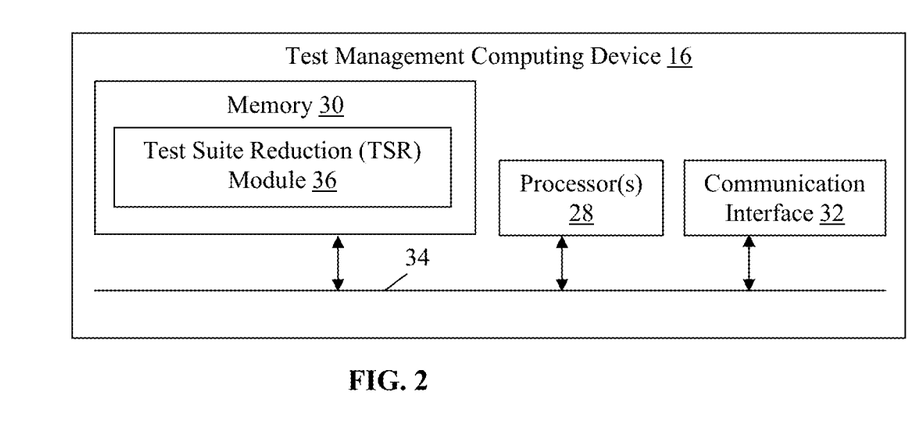
FIG. 2 is a block diagram of the exemplary test management computing device of FIG. 1.

Referring to FIGS. 1-2, the test management computing device 12 generally analyzes and optimizes test scripts and/or test metadata associated with test suites stored in the test database 16 for testing one or more of the enterprise application(s) 20. The test management computing device 12 in this example includes processor(s) 28, a memory 30, and/or a communication interface 32, which are coupled together by a bus 34 or other communication link, although the test management computing device 12 can include other types and/or numbers of elements in other configurations.

The processor(s) 28 of the test management computing device 12 may execute programmed instructions stored in the memory 30 for any number of the functions identified earlier and described and illustrated in more detail later. The processor(s) 28 may include one or more CPUs or general purpose processors with one or more processing cores, for example, although other types of processor(s) can also be used.

The memory 30 of the test management computing device 12 stores these programmed instructions for one or more aspects of the present technology as described and illustrated herein, although some or all the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 28, can be used for the memory 30.

Accordingly, the memory 30 of the test management computing device 12 can store one or more applications that can include computer executable instructions that, when executed by the test management computing device 12, cause the test management computing device 12 to perform actions, such as to transmit, receive, or otherwise process messages and data, for example, and to perform other actions described and illustrated below with reference to FIGS. 3-6. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the test management computing device 12 itself, may reside in virtual server(s) running in a cloud-based computing environment rather than being tied to one or more specific physical network computing devices. Also, the application (s) may be running in one or more virtual machines (VMs) executing on the test management computing device 12. Additionally, in one or more embodiments of this technology, virtual machine(s) running on the test management computing device 12 may be managed or supervised by a hypervisor.

In this example, the memory 30 includes a test suite reduction (TSR) module 36, although the memory 30 can include other policies, modules, databases, or applications, for example. The TSR module 36 in this example is configured to obtain test scripts and/or test metadata from the test database and analyze the test scripts and/or test metadata to identify potentially redundant test scripts based on a semantic analysis. Accordingly, the TSR module 36 analyzes test scripts and/or test metadata associated with test scripts based on the natural language or computer language content instead of based on the functionality that the test scripts provide. The TSR module 36 is further configured to output indications of test scripts that are candidates for removal, receives selections of the candidate test scripts, and update the test database 16 to reflect a reduced suite of test scripts, as described and illustrated in more detail later with reference to FIGS. 3-6.

The communication interface 32 of the test management computing device 12 operatively couples and communicates between the test management computing device 12 and at least the ALM device 14 and SME device 24, and optionally the enterprise user device 22 and/or application server 18, which are all coupled together by the communication network(s) 26, although other types and/or numbers of communication networks or systems with other types and/or numbers of connections and/or configurations to other devices and/or elements can also be used.

By way of example only, the communication network(s) 26 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 26 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

While the test management computing device 12 is illustrated in FIG. 1 as a standalone device, in other examples, the test management computing device 12 can be part of the ALM device 14, such as a module of the ALM device 14 or a device within the ALM device 14. In yet other examples, one or more of the application server 18, ALM device 14, or test management computing device 12 can be part of the same apparatus, and other arrangements of the devices of FIG. 1 can also be used.

The ALM device 14 in this example includes one or more processors, a memory, and a communication interface, which are coupled together by a bus or other communication link, although other numbers and/or types of network devices could be used. The ALM device 14 hosts a test database 16 that includes one or more suites of test scripts and associated test metadata, such as descriptions or names of the test scripts or particular steps of the test scripts, for example.

The ALM device 14 may be a server or other type of computing devices configured to communicate with the test management computing device 12 via the communication networks 26 to exchange information, such as contents of the test database. In some examples, the ALM device 14 can communicate with the SME device 24 to facilitate testing of one or more of the enterprise application(s) 20, although other functionality can also be provided by the ALM device 14 in other examples.

The application server 18 in this example includes one or more processors, a memory, and a communication interface, which are coupled together by a bus or other communication link, although other numbers and/or types of network devices could be used. The application server 18 process messages received from the enterprise user device 22 via the communication network(s) 26 according to the HTTP-based application RFC protocol, for example.

The application server 18 may be hardware or software or may represent a system with multiple servers in a pool, which may include internal or external networks. The application server 18 may host enterprise application(s) 20 that can be accessed by the enterprise user device 22. The server devices 18(1)-18(n) may operate as a plurality of network computing devices within a cluster architecture, a peer-to peer architecture, virtual machines, or within a cloud architecture, for example. The technology disclosed herein is not to be construed as being limited to a single environment and other configurations and architectures are also envisaged.

Each of the enterprise user device 22 and SME device 24 in this example includes any type of computing device that can receive, render, and facilitate user interaction with graphical user interfaces and/or enterprise application(s) 20, such as mobile computing devices, desktop computing devices, laptop computing devices, tablet computing devices, virtual machines (including cloud-based computers), or the like. Each of the enterprise user device 22 and SME device 24 in this example includes a processor, a memory, and a communication interface, which are coupled together by a bus or other communication link, although other numbers and/or types of network devices could be used. The enterprise user device 22 and SME device 24 may further include a display device, such as a display screen or touchscreen, and/or an input device, such as a keyboard, for example.

The enterprise user device 22 and SME device 24 may run interface applications, such as standard web browsers or standalone client applications, which may provide an interface to communicate with one or more of the test management computing device 12, ALM device 14, or application server 18 via the communication network(s) 26. The enterprise user device 22 may communicate via the communication network(s) 26 with the application server 18 to interface with the enterprise application(s). Additionally, the SME device 24 may communicate via the communication network(s) 26 with the ALM device 14 to initiate a testing of one of the enterprise application(s) 20 and/or with the test management computing device 12 to initiate a semantic test suite reduction, as described and illustrated in more detail later.

Although the exemplary network environment 10 with the test management computing device 12, ALM device 14, application sever 18, enterprise user device 22, SME device 24, and communication network(s) 26 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the test management computing device 12, ALM device 14, application sever 18, enterprise user device 22, or SME device 24, for example, may be configured to operate as virtual instances on the same physical machine. In other words, one or more of the test management computing device 12, ALM device 14, application sever 18, enterprise user device 22, or SME device 24 may operate on the same physical device rather than as separate devices communicating through communication network(s) 26. Additionally, there may be more or fewer test management computing devices, ALM devices, application severs, enterprise user devices, or SME device 24 than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
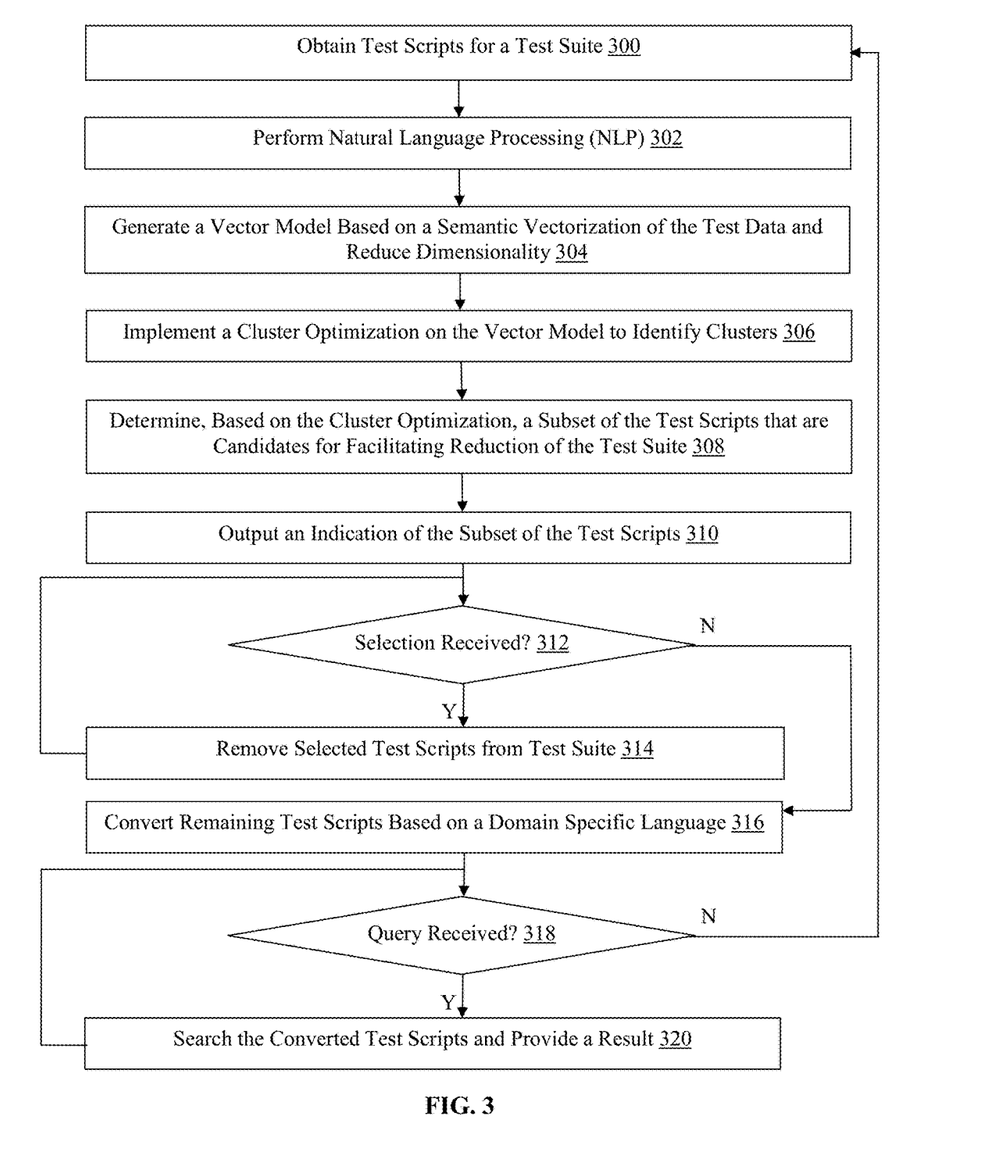
FIG. 3 is a flow chart of an exemplary method for reducing and optimizing a test suite of test scripts.

An exemplary method of semantic test suite reduction will now be described with reference to FIGS. 1-5. Referring more specifically to FIG. 3, a method of reducing and optimizing a test suite is illustrated. In step 300 in this example, the test management computing device 12 obtains test scripts and/or test metadata for a test suite. The test scripts and/or test metadata can be obtained from the test database 16 hosted by the ALM device 14 via the communication network(s) 26, for example, although the test scripts and/or test metadata can be obtained from other locations in other examples.

In this example, the test scripts and/or test metadata are in a natural language or computer language format or a combination of both. The test scripts can each correspond to specific functionality of one or more of the enterprise application(s) 20 to be tested. The test metadata can include descriptions of the tests scripts or names or descriptions of steps included in the test scripts, for example, although other types of test metadata can be obtained in other examples.

In step 302, the test management computing device 12 optionally performs natural language processing (NLP) step (s) on the test scripts and/or test metadata. The NLP steps can include feature extraction, stop words removal, stemming, or n-gram generation, for example, although other types and numbers of NLP step(s) can also be performed in step 302. Exemplary NLP steps are described and illustrated in more detail later with reference to FIG. 5. In some examples, the test scripts and/or test metadata is obtained in an ASCII format, and the optional NLP processing distills and modifies the test scripts and/or test metadata such that it is in a more effective format for subsequent processing.

In step 304, the test management computing device 12 generates a vector model based on a semantic vectorization of the test scripts and/or test metadata. In one example, the test management computing device 12 generates a matrix including a correspondence of test scripts with associated terms in the natural language or computer language format. In this example, the test management computing device 12 can generate a two-dimensional term document matrix having columns corresponding to test scripts and rows corresponding to terms extracted from the test scripts and/or test metadata, although other types of matrices can be generated in step 304. Accordingly, the terms can be included in the scripts themselves, in associated metadata, such as script descriptions or step names.

The matrix in this example represents a vector model, which is generally sparse since many terms will only exist in a relatively small subset of test scripts. Accordingly, the test management computing device 12 optionally reduces a dimensionality of the generated vector model in step 304, such as via normalization or a component analysis method, for example. Although potentially lossy, reducing the dimensionality of the vector model reduces the complexity of the vector model, including the quantity of empty or zero entries, and thereby facilitates relatively efficient subsequent processing.

In step 306, the test management computing device 12 implements one or more cluster optimizations on the vector model generated in step 304 to identify a plurality of maximally separate and compact clusters of test scripts based on a similarity metric. Exemplary cluster optimizations include machine learning processes that can be implemented on the vector model such as random decision forest, support vector machines (SVM), k-means, and neural network optimizations, but other types of cluster optimizations can also be used in other examples.

In step 308, the test management computing device 12 determines, based on the result of the cluster optimization, a subset of the test scripts that are candidates for facilitating reduction of the test suite for which the associated test scripts and/or test metadata was obtained in step 300. In examples in which the vector model generated in step 304 is based on a term document matrix, the data points in the clusters represent the test scripts such that test scripts closer together in a cluster are more likely to be duplicative or amenable to combination to reduce the overall quantity of test scripts in the test suite. Accordingly, the test management computing device 12 can apply a configurable threshold closeness to the result of the cluster optimization to determine the candidate redundant test scripts, although other methods of determining the candidate redundant test scripts can also be used in other examples.

In step 310, the test management computing device 12 outputs an indication of the subset of the test scripts that are candidates for facilitating reduction of the test suite. The indication of the subset of the test scripts can be output via a graphical user interface (GUI) available to the SME device 24 via the communication network(s) 26, although other methods of outputting the indication of the subset of the test scripts can also be used. The output GUI optionally facilitates selection by an SME using the SME device 24 of one or more of the identified subset of the test scripts, which are candidates for removal or consolidation.

Accordingly, in step 312, the test management computing device 12 determines whether a selection of one of the indicated subset of the test scripts is received. If the test management computing device 12 determines that a selection of one of the indicated subset of the test scripts is received, then the Yes branch is taken to step 314.

In step 314, the test management computing device 12 removes the selected one of the indicated subset of the test scripts from the test suite, such as by instructing the ALM device 14 to remove the test script from the test database 16, for example. In another example, the GUI output in step 310 can facilitate modification of one or more of the identified subset of the test scripts such that two or more of the test scripts can be combined, for example.

In yet another example, the test management computing device 12 can be configured to automatically remove test scripts identified as redundant without receiving SME input and based on the configurable threshold relating to the closeness of the test scripts in a given cluster. The test management computing device 12 can also store changes to the test suite and/or test script(s) locally in the memory 30 and subsequently reincorporate the test scripts of the test suite into the test database 16, and other methods of facilitating reduction of the test suite based on the identified candidate test scripts can also be used.

After removing a selected test script from the test suite in 314, the test management computing device 12 returns to step 312 in this example and again determines if one of the indicated subset of the test scripts is selected. However, if the test management computing device 12 determines that a selection of one of the indicated subset of the test scripts is not received in this iteration, then the No branch is taken from step 312 to step 316.

In step 316, the test management computing device 12 optionally automatically converts the remaining test scripts there were not removed in step 314 based on a domain specific language (DSL). The DSL in this example includes a standard grammar used for describing the remaining test scripts. By converting the remaining test scripts based on a DSL, the test suite can be more effectively searched, such as prior to adding a new test script, to avoid duplication. Optionally, the test management computing device 12 can store the converted remaining test scripts in place of, or in combination with (e.g., as test metadata), the remaining test scripts in the test database 16.

In step 318, the test management computing device 12 determines whether a query of the test suite is received. In this example, the test management computing device 12 can provide an interface to the SME device 24 that facilitates searching of test suites based on either natural language, computer language or the DSL derived from the optimized test suite to determine whether test script(s) for specific functionality of one or more of the enterprise application(s) 20 already exists. If the test management computing device 12 determines that a query is received, then the Yes branch is taken to step 320.

In step 320, the test management computing device 12 searches the converted test scripts based on search terms included in the query and generates a result. The result can be an indication of one or more of the converted scripts and can be provided via a GUI and communication network(s) 26 by the test management computing device 12. After providing a result, the test management computing device 12 proceeds back to step 318 in this example, and again determines whether a query is received. However, if the test management computing device 12 determines in step 318 that a query is not received in this iteration, then the No branch is optionally taken back to step 300 and the test management computing device 12 again obtains test scripts and/or test metadata for the same or a different test suite.

Figure 4:
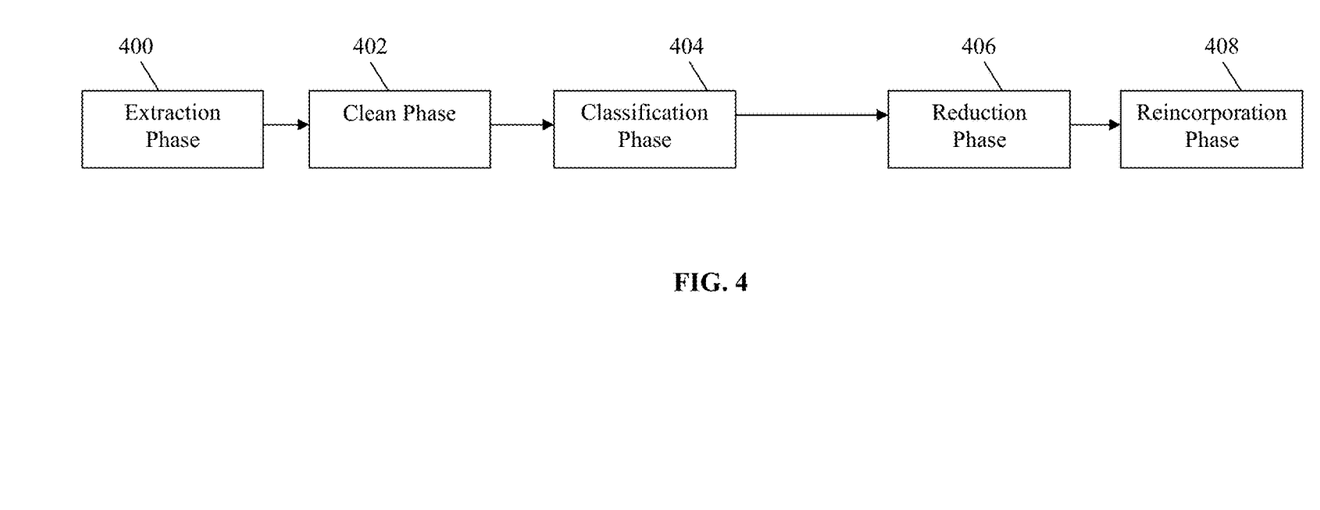
FIG. 4 is a flow diagram illustrating exemplary phases of an exemplary method for semantic test suite reduction.

Referring more specifically to FIG. 4, a flow diagram illustrating exemplary phases 400-408 of an exemplary method for semantic test suite reduction is illustrated. In this example, the test management computing device 12, in an extraction phase 400, extracts test scripts and/or test metadata for a test suite, such as in the form of an ASCII dump of test scripts and description and steps test metadata, from the test database 16, as described and illustrated in more detail earlier with reference to step 300 of FIG. 3.

In a clean phase 402, the test management computing device 12 implements a semantic vectorization to generate a vector model and optionally reduces a dimensionality of the vector model, as described and illustrated in more detail earlier with reference to step 304 of FIG. 3. Also in the clean phase 402, the test management computing device 12 utilizes NLP and latent semantic analysis to generate a vector model, such as in the form of a term-document matrix, for example. The vector model can include a correspondence of terms in the natural language or computer language scripts, and/or associated descriptions of steps, for example.

In a classification phase 404 in this example, the test management computing device 12 implements a cluster optimization in the form of a machine learning process, for example, on the generated vector model to identify clusters of test scripts based on a similarity of the associated terms. Accordingly, the test management computing device 12 in the classification phase 404 identifies clusters of test scripts having similar associated terms, based on cluster optimization(s) applied to the generated vector model, as described and illustrated in more detail earlier with reference to step 306 of FIG. 3.

In a reduction phase 406, the test management computing device 12 identifies candidate test scripts in the various clusters that may be duplicates based on a threshold closeness with respect to one or more other test scripts in a same cluster, as described and illustrated in more detail earlier with reference to step 308 of FIG. 3. Additionally, the test management computing device 12 can output an indication of the candidate test scripts via a custom mechanism or GUI, receive selections of test scripts to be removed from the test suite, generate a list of removed test scripts based on the selections, and facilitate other actions with respect to the candidate test scripts.

In a reincorporation phase 408 in this example, the test management computing device 12 reincorporates a modified ASCII dump of remaining test scripts and associated metadata into the test database 16, for example, as described and illustrated in more detail earlier with reference to steps 314-316 of FIG. 3. Accordingly, the resulting test suite is advantageously optimized and reduced to facilitate more efficient testing of associated enterprise application(s) 20.

Figure 5:
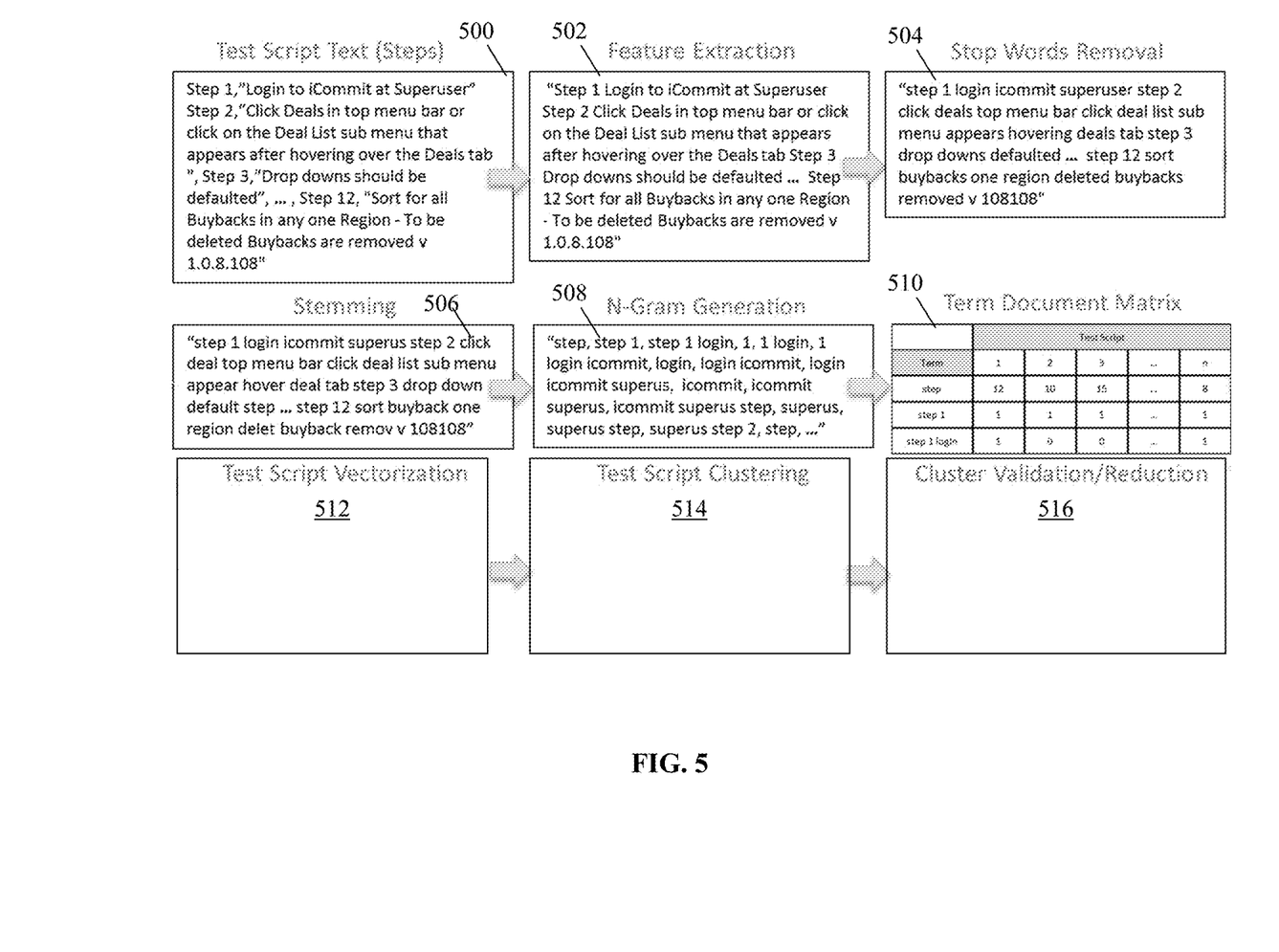
FIG. 5 is a flow diagram of an exemplary method for semantic test suite reduction as applied to a particular exemplary test script.

Referring more specifically to FIG. 5, a flow diagram of an exemplary method for semantic test suite reduction as applied to an exemplary test script is illustrated. In step 500 in this example, the test management computing device 12 obtains test scripts and/or test metadata for a test suite including natural language steps associated with a test script. The steps correspond to a testing sequence for testing an enterprise application in this example.

In steps 502-508, the test management computing device 12 performs various NLP steps on the natural language text for the steps corresponding to a test script. In this example, the test management computing device 12 performs a feature extraction NLP step in step 502, which includes removing certain punctuation (e.g., commas and quotation marks) from the natural language text, although other types and numbers of features can be removed in other examples.

In step 504, the test management computing device 12 performs a stop word removal NLP step to thereby remove certain terms that have reduced value with respect to the steps (e.g., "to", "in", "on", and "the"). Optionally, the test management computing device 12 can have a database of features and stop words that can be compared to the obtained test scripts and/or test metadata in steps 502 and 504 to carry out the NLP.

In step 506, the test management computing device 12 performs a stemming NLP step to improve subsequent comparison between terms in the test scripts and/or test metadata. In this example, the test management computing device 12 changes "appear" to "appears" and "deals" to "deal", although other types and numbers of words can also be modified as part of a stemming process in other examples.

In step 508, the test management computing device 12 performs an n-gram generation NLP step to reformulate the text such that longer terms can be compared to improve the accuracy of subsequent processing of the test scripts and/or test metadata. For example, a test script with a term of "step 1 login" will be closer to another test script that includes "step 1 login" as an associated term than to yet another test script that simply includes "step" "1" and "login" as associated terms.

In step 510, the test management computing device 12 generates a term-document matrix vector model in which the columns are each associated with a test script and the rows are each associated with a term such that the term document matrix embodies a correspondence of all terms with all test scripts and/or test metadata. Optionally, the test management computing device 12 performs a test script vectorization step in step 512 using the term-document matrix to generate a vector space model with reduced dimensionality.

In step 514, the test management computing device 12 implements a cluster optimization on the vector model generated in steps 510 and 512 to identify clusters of test scripts. Based on a similarity metric and configurable threshold, the test management computing device identifies test scripts that are candidates for consolidation or removal from the test suite. In step 516, the test management computing device 12 outputs an indication of the candidate redundant test scripts and facilitates a reduction in the size of the test suite by removing from the test suite one or more test scripts selected by an SME, for example.

As described and illustrated herein, this technology advantageously facilitates reduced and optimized test suites, thereby solving a technical problem of efficient testing of enterprise applications, which only exists in the realm of computer technology. This technology reduces enterprise application test suite size by identifying and removing redundant test scripts, while maintaining scope with respect to enterprise application functionality, to facilitate more efficient testing of enterprise applications. This technology also facilitates improved test suite maintenance and searching of test suites to prevent duplication of test scripts, thus providing a mechanism for ensuring that test suites exhibit a high level of cleanliness over time.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for semantic test suite reduction, the method comprising:
    receiving, by a test management computing device, at least one of a plurality of test scripts associated with a test suite for testing an application, test metadata for the plurality of test scripts, and a query, wherein the query comprises one or more search terms;

generating, by the test management computing device, a vector model based on a semantic vectorization of the at least one of the plurality of test scripts and the test metadata;

implementing, by the test management computing device, a cluster optimization on the vector model to identify a plurality of maximally separate and compact clusters;

determining, by the test management computing device, based on the identified clusters, and outputting an indication of each test script of a subset of the test scripts that are candidates for facilitating reduction of the test suite;

converting, by the test management computing device, a plurality of remaining ones of the test scripts based on a domain specific language (DSL) comprising a standard grammar for describing the plurality of remaining ones of the test scripts, wherein the plurality of remaining ones of the test scripts indicate a difference between the plurality of test scripts and the subset of the test scripts that are candidates for facilitating reduction of the test suite;

searching, by the test management computing device, the plurality of converted remaining ones of the test scripts based on the one or more search terms in the query; and providing, by the test management computing device, a result in response to the received query based on the searching.

2. The method of claim 1, further comprising reducing, by the test management computing device, a dimensionality of the generated vector model.

3. The method of claim 1, further comprising implementing, by the test management computing device, one or more natural language processing (NLP) steps on at least one of the plurality of test scripts and the test metadata prior to generating the vector model, the NLP steps comprising extracting one or more features, removing one or more stop words, stemming, or generating one or more n-grams.

4. The method of claim 1, wherein the test scripts comprises a plurality of terms and the method further comprises generating, by the test management computing device, the vector model based on a term-document matrix comprising a correspondence of the plurality of terms to the test scripts.

5. The method of claim 1, wherein the subset of the test scripts comprises two or more of the test scripts and the method further comprises:
receiving, by the test management computing device, a selection of one or more of the indications; and
removing, by the test management computing device, one or more of the subset of the test scripts, corresponding to the selected one or more indications, from the test suite to generate a reduced test suite.

6. A test management computing device, comprising a memory comprising programmed instructions stored thereon and one or more processors coupled to the memory and configured to execute the stored programmed instructions to:
receive at least one of a plurality of test scripts associated with a test suite for testing an application, test metadata for the plurality of test scripts, and a query, wherein the query comprises one or more search terms;
generate a vector model based on a semantic vectorization of the at least one of the plurality of test scripts and the test metadata;
implement a cluster optimization on the vector model to identify a plurality of maximally separate and compact clusters;
determine, based on the identified clusters, and outputting an indication of each test script of a subset of the test scripts that are candidates for facilitating reduction of the test suite;
convert a plurality of remaining ones of the test scripts based on a domain specific language (DSL) comprising a standard grammar for describing the plurality of remaining ones of the test scripts, wherein the plurality of remaining ones of the test scripts indicate a difference between the plurality of the test scripts and the subset of the test scripts that are candidates for facilitating reduction of the test suite;
search the plurality of converted remaining ones of the test scripts based on the one or more search terms in the query; and
provide a result in response to the received query based on the searching.

7. The test management computing device of claim 6, wherein the one or more processors are further configured to be capable of executing the stored programmed instructions to reduce a dimensionality of the generated vector model.

8. The test management computing device of claim 6, wherein the one or more processors are further configured to be capable of executing the stored programmed instructions to implement one or more natural language processing (NLP) steps on at least one of the plurality of test scripts and the test metadata prior to generating the vector model, the NLP steps comprising extracting one or more features, removing one or more stop words, stemming, or generating one or more n-grams.

9. The test management computing device of claim 6, wherein the test scripts comprises a plurality of terms and the one or more processors are further configured to be capable of executing the stored programmed instructions to generate the vector model based on a term-document matrix comprising a correspondence of the plurality of terms to the test scripts.

10. The test management computing device of claim 6, wherein the subset of the test scripts comprises two or more of the test scripts and the one or more processors are further configured to be capable of executing the stored programmed instructions to:
receive a selection of one or more of the indications; and
remove one or more of the subset of the test scripts, corresponding to the selected one or more indications, from the test suite to generate a reduced test suite.

11. A non-transitory computer readable medium having stored thereon instructions for semantic test suite reduction comprising executable code which when executed by one or more processors, causes the one or more processors to:
receive at least one of a plurality of test scripts associated with a test suite for testing an application, test metadata for the plurality of test scripts and a query, wherein the query comprises one or more search terms;
generate a vector model based on a semantic vectorization of the at least one of the plurality of test scripts and the test metadata;
implement a cluster optimization on the vector model to identify a plurality of maximally separate and compact clusters;
determine, based on the identified clusters, and outputting an indication of each test script of a subset of the test scripts that are candidates for facilitating reduction of the test suite;
convert a plurality of remaining ones of the test scripts based on a domain specific language (DSL) comprising a standard grammar for describing the plurality of remaining ones of the test scripts, wherein the plurality of remaining ones of the test scripts indicate a difference between the plurality of test scripts and the subset of the test scripts that are candidates for facilitating reduction of the test suite;

search the plurality of converted remaining ones of the test scripts based on the one or more search terms in the query; and provide a result in response to the received query based on the searching.

12. The non-transitory computer readable medium of claim 11, wherein the executable code, when executed by the one or more processors, further causes the one or more processors to reduce a dimensionality of the generated vector model.

13. The non-transitory computer readable medium of claim 11, wherein the executable code, when executed by the one or more processors, further causes the one or more processors to implement one or more natural language processing (NLP) steps on at least one of the plurality of test scripts and the test metadata prior to generating the vector model, the NLP steps comprising extracting one or more features, removing one or more stop words, stemming, or generating one or more n-grams.

14. The non-transitory computer readable medium of claim 11, wherein the test scripts comprises a plurality of terms and the executable code, when executed by the one or more processors, further causes the one or more processors to generate the vector model based on a term-document matrix comprising a correspondence of the plurality of terms to the test scripts.

15. The non-transitory computer readable medium of claim 11, wherein the subset of the test scripts comprises two or more of the test scripts and the executable code, when executed by the one or more processors, further causes the one or more processors to:

receive a selection of one or more of the indications; and remove one or more of the subset of the test scripts, corresponding to the selected one or more indications, from the test suite to generate a reduced test suite.

* * * * *